United States Patent [19]

Fels, Jr.

[11] Patent Number: 5,623,048
[45] Date of Patent: Apr. 22, 1997

[54] CLEAR AMBER-BASED VARNISH AND PRODUCTION THEREOF

[76] Inventor: Donald C. Fels, Jr., 1333 King St., Greenwich, Conn. 06831

[21] Appl. No.: 606,204

[22] Filed: Feb. 23, 1996

[51] Int. Cl.$^6$ .............................. C08L 93/04; C09D 5/06; C09D 193/04

[52] U.S. Cl. .................. 530/203; 106/222; 106/227; 106/228

[58] Field of Search .................. 106/222, 227, 106/228; 530/203

[56] References Cited

U.S. PATENT DOCUMENTS

| | | | |
|---|---|---|---|
| 139,402 | 5/1873 | Lee | 530/220 |
| 286,528 | 10/1883 | Borowsky | 530/203 |
| 737,249 | 8/1903 | Kronstein | 106/222 |
| 877,482 | 1/1908 | Bjerregaard | 530/203 |
| 1,011,659 | 12/1911 | Strange | 530/203 |
| 1,265,326 | 5/1918 | Griem | 530/203 |
| 1,340,873 | 5/1920 | Brooks | 530/203 |
| 1,381,863 | 6/1921 | Ellis et al. | 530/203 |

FOREIGN PATENT DOCUMENTS

| | | | |
|---|---|---|---|
| 0013925 | 6/1996 | United Kingdom | 106/227 |

OTHER PUBLICATIONS

Translated Extract from Pictoria, Sculptoria, Tinctoria, et qua Subalternarum Artium, by Sir Theodore Turquet de Mayerne, British Museum, Sloane Manuscript Document No. 2052 (1620).

Extract of Charles Reade Letters published in Pall Mall Gazette (1872).

Extract re Simon Martin's 1744 Patent originally published in Materials For History of Oil Painting by Sir Charles Lock Eastlake, 2 pages (1847).

Original Treatises on the Arts of Painting by Mary P. Merrifield, pp. cclxxii to cclxxv, Dover Pub. 1967.

The Painter and Varnisher's Guide, P.F. Tingry, pp. 26–35, 164–171, 196–209 (1804).

The Book of Amber, Dr. George C. Williamson, pp. 230–235, Ernest Benn Limited, London (1932).

Methods and Material of Painting of the Great Schools and Masters by Sir Charles Lock Eastlake, vol. One, pp. 274–319, 442–445, and 534–535; vol. Two, pp. 26–29, 34–37, 50–53, 219–273, and 290–297, Dover Publications (1960).

*Primary Examiner*—Peter A. Szekely
*Attorney, Agent, or Firm*—Parmelee, Bollinger & Bramblett; George W. Rauchfuss, Jr.

[57] ABSTRACT

Amber-based drying oil varnish of improved clarity, colorless and transparency characteristics is provided by a process in which coarsely comminuted amber particles are first heated in drying oil until the amber particles soften, swell and rise to the surface of the heated drying oil, the hot amber particles are strained from the hot drying oil which has become discolored and is discarded, the hot strained amber particles are then finely comminuted to a powder in a small amount of hot drying oil and thereafter, after the addition of additional hot drying oil to the finely comminuted amber powder, the resulting admixture is heated to a temperature at which the amber powder melts and fuses into the heated drying oil to form an essentially homogeneous varnish solution.

34 Claims, No Drawings

CLEAR AMBER-BASED VARNISH AND PRODUCTION THEREOF

FIELD OF THE INVENTION

This invention relates to clear varnish formulation based on amber resin and the production thereof. More particularly the invention relates to clear, lustrous varnishes based on amber resin and the production thereof, which varnishes are essentially colorless and transparent and which, when mixed with pigments, especially white or blue pigments, do not cause a yellowing or change in tint of said pigments.

BACKGROUND OF THE INVENTION

Amber is a polymerized fossil resin derived from an extinct variety of pine. Although deposits of amber are to be found in several places throughout the earth, the most plentiful and widely employed source is found in the Baltic area, especially in what was known as Prussia, more especially in and around the cities of Danzig and Königsberg. Amber resin can be from a pale yellow to a reddish-brown colored resin which softens at about 150° C. (302° F.) and has a melting point of about 350° to 375° C. (662° to 707° F.). From very ancient times amber has been added to drying oils to prepare varnishes. The addition of amber to drying oils increases the drying rate and the glass transition temperature, Tg, of solvent free drying oils so that film hardness is achieved more rapidly.

With the flowering of oil painting in the 16th and 17th centuries, especially in the Flemish school by Van Eck, Memling and others and in the Italian school by Perugino, Da Vinci, Bellini, Correggio and others, the superior qualities of amber-based varnish was recognized especially as a vehicle for pigments. The use of amber-linseed oil varnishes, generally manufactured by the artists themselves during this period, provided an especially suitable medium for the union of various colors and tints—enabling the artists to imitate nature in their paintings. Anyone who has viewed paintings by the artists of this era recognizes this quality in their paintings. However, with the passing-on of these artists the manufacture itself of such high quality amber-based varnishes disappeared and production of amber-based varnishes became problematic since the methods devised for producing same resulted in amber varnishes having undesirable color characteristics of darkness and lack of clarity.

One of the problems with amber-based varnishes is that, although they possess superior qualities of durability, smoothness and hardness among others, it has not been considered possible to produce such varnishes in a colorless condition and with a transparency such that when mixed with pigments, especially white and blue pigments, so as to avoid some undesirable yellowing of the pigments or loss of brilliance, lustrousness or clarity of the pigments.

Over the last several centuries, although some art historians have believed that the amber-based varnish manufacturing methods of the 16th and 17th centuries artisans has been "lost" because it has not been possible to produce sufficient colorless amber-based varnish to avoid the yellowing problem with white and blue pigments, other art historians have questioned whether or not said artisans actually were able to employ such amber-based varnishes as pigment mediums and have postulated all manners of theories as to what those ancient artisans might have employed instead of amber-based varnishes in order to retain the brilliance, luster and clarity of such pigments in their paintings.

Since it has not been possible to produce such clear, essentially colorless amber-based varnishes, the use of amber in varnishes has been replaced by other natural resinous materials such as copal, rosin, congo gum, dammar and the like and by synthetic resins such as phenol-formaldehyde or urea-formaldehyde resins. However, varnishes based on these other resins, both natural and synthetic, lack the superior qualities of amber-based varnishes and do not enable artisans to obtain the satisfactory union of colors and tints with the desired durability, smoothness and hardness to enable them to imitate nature in their paintings in the manner achieved by the 16th and 17th century artisans.

It is therefore highly desirable that amber-based varnishes having sufficient characteristics of colorness and clarity be available to artisans so that said artisans can employ those varnishes as vehicles for all pigments, but especially white and blue pigments, without loss of brilliance, luster and clarity and permitting the artists to produce pictures imitating nature, and allowing for satisfactory union of colors and tints to produce almost any gradation considered desirable. It is further desirable that a method for producing such essentially clear, colorless amber-based varnishes be available. Such varnishes can also be used as varnishes for woodworking and for varnishing musical instruments and the like or for any use calling for application of a varnish.

SUMMARY OF THE INVENTION

In accordance with this invention, greatly improved and more colorless and transparent amber-based drying oil varnishes are produced. Said improved varnishes are produced by a process wherein in the process for producing amber-based drying oil varnishes by the step of heating finely ground amber powder in drying oil to a temperature sufficient to melt the amber powder and fuse it into the drying oil to form an essentially homogeneous varnish solution, the improvement comprising obtaining a clearer, more colorless and transparent amber-based drying oil varnish by, before said heating step:

heating an admixture of 1 part by weight coarsely comminuted amber particles and about 3 to 20 parts by weight drying oil to a temperature at which the coarsely comminuted amber particle soften, start to swell and rise to the surface of the heated drying oil;

straining the hot amber particles from the drying oil;

comminuting the hot strained amber particles to a fine powder in a quantity of preferably neat, hot drying oil sufficient to facilitate comminution of the amber particles to a fine powder; and thereafter adding to said finely ground amber powder-drying oil admixture additional neat, hot drying oil to provide a weight ratio of 1 part amber to about 3 to 20 parts drying oil.

More particularly, in a preferred aspect of the invention, said improved process for producing improved amber-based drying oil varnishes comprises the step of:

(1) providing amber comminuted to particles of a size in the range of about 1 to about 7 mm;

(2) admixing, in a vessel having a restricted access to oxygen, the comminuted amber particles and drying oil in a ratio from about 1 part amber to about 3 to 20 parts by weight oil and heating the drying oil to a temperature at which the amber particles soften, start to swell and rise to the top surface of the heated drying oil in the vessel;

(3) straining the heated admixture of step (2) to remove the amber particles from the heated drying oil;

(4) in a comminuting vessel heated to a temperature in the range of about 200° to 375° F. (93° to 191° C.) placing a first quantity of drying oil heated to a temperature in the range of about 200° to 400° F. (93° to 204° C.) and adding thereto the hot, strained amber particles of step (3) and finely comminuting the strained amber particles to produce a finely powdered slurry product of amber-drying oil having essentially a honey-like consistency; the first quantity of heated oil being at least sufficient to permit comminuting of the strained amber particles in said comminuting vessel;

(5) admixing the comminuted amber-drying oil product of step (4) with a second quantity of said drying oil heated to a temperature in the range of 200° to 400° F. (93° to 204° C.) in a vessel having a restricted access to oxygen and heating said admixture to a temperature sufficient to slowly melt the amber and fuse it into the drying oil forming an essentially homogeneous solution; said second quantity of drying oil being sufficient when added to the product of step (4) to result in an amber-based varnish; and (6) quickly cooling said essentially homogeneous solution of step (5) to a temperature no higher than about 350° F. (177° C.) and removing any particulate residue therefrom thereby producing an amber-based drying oil varnish.

Once the amber-based drying oil varnish is obtained, it can, if desired, be thinned with hydrocarbon solvents to reduce the viscosity of the varnish and improve its ease of application. Thinning of the varnish is to be done while the varnish is still hot. However, the solvents to be added can be either heated or cold, i.e. room temperature, solvents, added in any suitable thinning amount.

Also, the amber-based drying oil varnish can be employed as a varnish per se and also as a vehicle for pigments and used as an artist's medium for oil painting. Any suitable pigment can be added thereof in an appropriate pigmenting amount.

DETAILED DESCRIPTION OF THE INVENTION

While the invention has particular applicability to producing essentially colorless, transparent amber-based drying oil varnishes, it is to be recognized that the process of the invention is also suitable for producing amber-based drying oil varnishes that are not colorless or transparent but which are suitable for uses in applications where the colorless and transparent properties are not critical. When it is desired to produce the essentially colorless transparent varnish, it is most desirable to start with the lightest grade amber resin available, preferably light jewelry grade amber. Where it is not necessary that the varnish product be essentially colorless, the amber resin employed can be a darker grade of amber resin. Amber in any form can be used, including its ambroid form.

Any suitable means of coarsely comminuting the amber resin to particles the size of unprocessed rice or buckwheat, i.e. generally of a particle size of about 1 to about 7 mm, can be employed in this invention. Preferably, a process is employed that does not involve the generation of any significant amount of heat. The amber particles are coarsely ground, not finely ground, so that it will both swell in process step (2) and can be readily separated in process step (3).

The coarsely broken up amber particles are first combined with a suitable drying oil in a vessel that provides a restricted access to oxygen in order to prevent or limit the oxygen available at the surface of the amber-oil mixture to inhibit the oil from flashing into flame. Either a vessel with a restricted access, e.g. a long neck flask, or a vessel provided with an inert atmosphere, e.g. nitrogen, can be employed.

The ratio of amber to drying oil in the varnish product can vary over a wide range, generally from about 1 part by weight resin to about 3 to 20 parts by weight drying oil, preferably in a range of from about 1:3 to about 1:5 parts by weight resin to oil. Higher levels of resin will generally result in undesirable darkening of the varnish and as the resin proportion is decreased the finished varnish becomes too diluted.

Any suitable drying oil can be employed in the varnishes and process of this invention, such as for example, raw or boiled linseed oil, walnut oil, degummed or refined soybean oil, tung oil, safflower oil, perilla oil, oiticia, dehydrated castor oil, fish oil (high IV fraction), poppy oil, hemp oil and the like, but preferably linseed oil or walnut oil and most preferably linseed oil, particularly in neat form.

The admixture of coarsely ground amber particles and drying oil is heated to cause the amber to swell and rise to the surface of the oil in the vessel. During this controlled heating step, it is believed that some of the softer parts of the amber resin which are more susceptible to burning and causing darkening (i.e. darkening agents) are separated from the amber resin and join the oil. In general the admixture of coarsely ground amber particles and drying oil is heated up slowly to a temperature of about 550° F. (287° C.), i.e. below the melting point of amber resin. The darkening agents join and darken the oil during the heating stage. When the heated amber particles have risen to the surface of the heated, darkened oil, the hot amber particles are strained out of the darkened oil. This darkened or adulterated oil may be subject to acceptable disposal methods since it is no longer required in the process.

Preferably, another quantity of preferably neat drying oil in an amount to provide the desired resin:oil ratio of the final varnish product has been heated to a temperature within the range of from about 200° to 400° F. (93° to 204° C.), preferably to about 300° F. (149° C.). A first portion of said heated preferably neat oil and the hot strained amber particles from step (3) are combined in a suitable comminuting vessel, such as a mortar or the like, which has been heated to a temperature within the range of from about 200° to 375° F. (93° to 191° C.), preferably at about 300° F. (149° C.), such as by being placed in a heated sand bath. The first quantity of such heated oil is an amount sufficient to permit fine comminution, such as grinding, of the hot amber particles until the amber particles are finely ground in the oil to produce a finely powdered slurry of a honey-like consistency.

This finely ground admixture is than admixed with a second portion, i.e. the remaining portion, of the preferably neat, heated drying oil in a vessel having a restricted access to oxygen and heated to a temperature sufficient to slowly melt the amber and fuse it into the drying oil. Generally the admixture will be heated to a temperature no higher than 725° F. (385° C.), generally to a temperature within the range of from about 600° to about 725° F. (316° to 385° C.) until the amber slowly fuses into the oil. Care is taken so that the solution is not over-heated in order to prevent burning and darkening of the varnish. As soon as the amber is essentially completely melted and fused into the oil and the homogeneous solution has become clear, the amber-based varnish product is removed from the heat source and quickly cooled to a temperature no higher than about 350° F. (177° C.), generally to a temperature within the range of from about 200°–350° F. (93°–177° C.), and the solution, while still of low viscosity, is then strained while hot to remove any particulate resin to produce the amber-based drying oil varnish product.

The hot varnish product can then either be thinned in its hot state by the addition of a suitable thinning amount of a hydrocarbon solvent, or the hot varnish can be cooled to room temperature and stored in a container for later use. The hydrocarbon solvent can be added to the hot varnish as either a cold, e.g. room temperature, or warmed solvent. Any suitable hydrocarbon thinning solvent may be employed, such as for example, naphtha, distilled spirits of turpentine, spike of lavender, rosemary oil or the like. The thinning solvent will be added to amber-based drying oil varnish while the varnish is hot, i.e. at a temperature below and preferably just below the flash point of the thinning solvent being added thereto.

If desired, amber-based drying oil varnish can have any suitable conventional additives added thereto. For example, it may be desirable to add thickeners, or stabilizers, such as rosin or turpentine gum, such as Venetian or Strasbourg turpentine gums, or driers, such as salts of cobalt, magnesium, cerium, chromium, lead, iron, nickel, zinc, or the like, such as for example the linoleate, naphthenate or resinate salts of said metals.

The amber-based drying oil varnishes produced according to the process of this invention in which the starting amber particles employed are light jewelry grade amber are essentially colorless, transparent varnish products especially useful as vehicles for pigments to provide painting oils for artists. Such essentially colorless, transparent varnishes may even have white or blue pigments, especially white pigment such as $TiO_2$ based powder pigments, added thereto and produce painting oils that do not yellow or change the tint, luster or brilliance of the pigment color and also provide painting oils producing desirable, smooth, hard finishes when dried on the painting medium and which permit the artist to produce a satisfactory blend of colors and tints enabling the artist's pictures to essentially and truly imitate nature. These amber-based drying oil varnishes may be used in any application calling for the use of a varnish.

The invention is illustrated but not limited by the following example.

EXAMPLE

High jewelry grade Baltic amber (succinite) was coarsely broken up into pieces about the size of unprocessed rice or buckwheat (about 1 to 7 mm in size) and about 100 grams of said amber pieces were placed in a long neck 1,000 ml flask. To the flask was added about 500 ml linseed oil. The amber and oil in the flask was heated to about 550° F. (287° C.) until the amber on the bottom softened, swelled, swirled in the oil and rose to the surface of the oil. The flask was removed from the source of heat and the hot amber was strained, removing it from the oil. The oil which remained was dark in color due in part to the portions of the amber which burned during the process of softening the amber. The darkened heated oil was discarded.

A large mortar was placed in a sand bath and preheated to 300° F. (149° C.). Into the heated mortar was placed 75 ml of linseed oil which had been heated to a temperature of about 300° F. (149° C.) and the hot, strained amber resin added to the heated oil. The hot amber in the oil was then finely ground with a pestle to a product of honey-like consistency.

In a clean, long neck 1000 ml flask was placed the finely ground amber-drying oil product and added thereto was about 425 ml of hot linseed oil which had been heated to a temperature of about 300° F. (149° C.) to provide a mixture of amber resin to linseed oil of about 1 part resin to about 5 parts oil. The content of the flask was then slowly heated to about 550° F. (287° C.) until the amber rose to the surface of the oil and then further heated to a temperature of 725° F. (385° C.) until the amber melted and fused into the linseed oil, with care taken to prevent over-heating, burning and darkening of the product due to excess heat. As soon as the fusion was complete and the solution became clear, the product was removed from the heat and quickly cooled to about 350° F. (177° C.) and strained while hot to remove any particulate residue thereby producing an essentially colorless, transparent amber-based varnish.

The amber-based varnish of the example is thinned at about 350° F. (177° C.) with about 500 ml of a hydrocarbon solvent, such as naphtha, distilled spirits of turpentine or spike of lavender, to reduce its viscosity and improve its ease of application.

The amber-based varnish of the example is also employed as a vehicle for pigments, such as for example $TiO_2$ pigment or the like, to produce oil painting mediums.

With the foregoing description of the invention, those skilled in the art will appreciate that modifications may be made to the invention without departing from the spirit thereof. Therefore, it is not intended that the scope of the invention be limited to the specific embodiments illustrated and described.

I claim:

1. In a process for producing amber-based drying oil varnishes by the step of heating ground amber powder in drying oil to a temperature sufficient to melt the amber powder and fuse it into the drying oil to form an essentially homogeneous varnish solution, the improvement comprising obtaining a clearer, more colorless and transparent amber-based drying oil varnish by, before said heating step:

(1) heating an admixture of 1 part by weight amber particles and about 3 to 20 parts by weight drying oil to a temperature at which the amber particle soften, start to swell and rise to the surface of the heated drying oil;

(2) straining the hot amber particles from the drying oil;

(3) comminuting the hot strained amber particles to a powdered slurry in a quantity of hot drying oil of a temperature of at least about 200° F. (93° C.) sufficient to facilitate comminution of the amber particles to a powder; and (4) thereafter adding to said ground amber powder-drying oil admixture additional hot drying oil of a temperature of at least about 200° F. (93° C.) to provide a weight ratio of 1 part amber to about 3 to 20 parts drying oil.

2. A method for the production of amber-based drying oil varnish comprising the steps of:

(1) providing amber comminuted to particles of a size in the range of about 1 to about 7 mm;

(2) admixing, in a vessel having a restricted access to oxygen, the comminuted amber particles and drying oil in a ratio from about 1 part by weight amber to about 3 to 20 parts by weight oil and heating the drying oil to a temperature at which the amber particles soften, start to swell and rise to the top surface of the heated drying oil in the vessel;

(3) straining the heated admixture of step (2) to remove the amber particles from the heated drying oil;

(4) in a comminuting vessel heated to a temperature in the range of about 200° to 375° F. (93° to 191° C.) placing a first quantity of drying oil heated to a temperature in the range of about 200° to 400° F. (93° C. to 204° C.) and adding thereto the hot, strained amber particles of step (3) and comminuting the strained amber particles to produce a ground powdered slurry of amber-drying oil product; the first quantity of heated oil being at least sufficient to permit comminuting of the strained amber particles in said comminuting vessel;

(5) admixing the comminuted amber-drying oil product of step (4) with a second quantity of said drying oil heated to a temperature in the range of 200° to 400° F. (93° to 204° C.) in a vessel having a restricted access to oxygen and heating said admixture to a temperature sufficient to melt the amber and fuse it into the drying oil forming an essentially homogeneous solution; said second quantity of drying oil being sufficient when added to the product of step ( 4 ) to result in an amber-based varnish; and (6) cooling said essentially homogeneous solution of step (5) to a temperature no higher than about 350° F. (177° C.) and removing any particulate residue therefrom thereby producing an amber-based drying oil varnish.

3. The process according to claim 2 wherein the ratio of amber to drying oil in step (2) is in the range of from about 1:3 to 1:5 parts by weight.

4. The process according to claim 3 wherein the second quantity of drying oil in step (5) is sufficient to produce an amber-based varnish in which the ratio of amber to drying oil is in the range of from about 1:3 to 1:5 parts by weight.

5. The process according to claim 2 wherein in step (2) the admixture is heated to a temperature of about 550° F.

6. The process according to claim 5 wherein in step (4) the comminuting vessel is heated to a temperature of about 300° F., the first quantity of oil is heated to a temperature of about 300° F., in step (5) the second quantity of drying oil is heated to a temperature of about 300° F. and said admixture in step (5) is heated to a temperature within the range of about 600° to 725° F.

7. The process according to claim 4 wherein in step (2) the admixture is heated to a temperature of about 550° F.

8. The process according to claim 7 wherein in step (4) the comminuting vessel is heated to a temperature of about 300° F., the first quantity of oil is heated to a temperature of about 300° F., in step (5) the second quantity of drying oil is heated to a temperature of about 300° F. and said admixture in step (5) is heated to a temperature within the range of about 600° to 725° F.

9. The process according to claim 6 wherein the essentially homogeneous solution in step (6) is cooled to a temperature of about 350° F. and at said temperature any of the particulate residue is removed.

10. The process according to claim 8 wherein the essentially homogeneous solution in step (6) is cooled to a temperature of about 350° F. and at said temperature any of the particulate residue is removed.

11. The process of claim 2 wherein the drying oil is linseed oil.

12. The process of claim 4 wherein the drying oil is linseed oil.

13. The process of claim 10 wherein the drying oil is linseed oil.

14. The process of claim 2 comprising the additional step (7) of thinning the amber-based drying oil varnish of step (6) by adding to said varnish a thinning amount of hydrocarbon thinning solvent when the varnish is at a temperature below the flash point of the solvent.

15. The process of claim 14 wherein the hydrocarbon thinning solvent is selected from the group consisting of naphtha, distilled spirits of turpentine and spike of lavender.

16. The process of claim 10 comprising the additional step (7) of thinning the amber-based drying oil varnish of step (6) by adding to said varnish a thinning amount of hydrocarbon thinning solvent when the varnish is at a temperature below the flash point of the solvent.

17. The process of claim 16 wherein the hydrocarbon thinning solvent is selected from the group consisting of naphtha, distilled spirits of turpentine and spike of lavender.

18. The process of claim 13 comprising the additional step (7) of thinning the amber-based drying oil varnish of step (6) by adding to said varnish a thinning amount of hydrocarbon thinning solvent when the varnish is at a temperature below the flash point of the solvent.

19. The process of claim 18 wherein the hydrocarbon thinning solvent is selected from the group consisting of naphtha, distilled spirits of turpentine and spike of lavender.

20. The process of claim 2 wherein the amber particles in step (1) are comminuted particles of light jewelry grade amber.

21. The process of claim 11 wherein the amber particles in step (1) are comminuted particles of light jewelry grade amber.

22. The amber-based drying oil varnish produced by the process of claim 2.

23. The amber-based drying oil varnish produced by the process of claim 10.

24. The amber-based drying oil varnish produced by the process of claim 13.

25. The amber-based drying oil varnish produced by the process of claim 14.

26. The amber-based drying oil varnish produced by the process of claim 16.

27. The amber-based drying oil varnish produced by the process of claim 20.

28. The amber-based drying oil varnish produced by the process of claim 21.

29. The amber-based drying oil varnish of claim 22 additionally comprising a pigmenting amount of a pigment added thereto.

30. The amber-based drying oil varnish of claim 23 additionally comprising a pigmenting amount of a pigment added thereto.

31. The amber-based drying oil varnish of claim 25 additionally comprising a pigmenting amount of a pigment added thereto.

32. The amber-based drying oil varnish of claim 28 additionally comprising a pigmenting amount of a pigment added thereto.

33. The amber-based drying oil varnish of claim 30 wherein the pigment comprises a white or blue pigment.

34. The amber-based drying oil varnish of claim 32 wherein the pigment comprises a white or blue pigment.

* * * * *